United States Patent Office 3,321,465
Patented May 23, 1967

3,321,465
AZIRIDINYL ETHERS AND THEIR
PREPARATION
Warren J. Rabourn, Lake Jackson, Tex., assignor to The
Dow Chemical Company, Midland, Mich., a corporation of Delaware
No Drawing. Original application Mar. 20, 1963, Ser.
No. 266,508, now Patent No. 3,247,185, dated Apr. 19,
1966. Divided and this application Sept. 30, 1965, Ser.
No. 508,406
7 Claims. (Cl. 260—239)

This application is a division of my copending application Ser. No. 266,508, filed Mar. 20, 1963, now Patent No. 3,247,185.

This invention relates to certain aziridinyl ethers, to methods for producing such ether and to processes utilizing such ethers.

It has now been discovered that aziridine and its C-substituted analogs react under certain conditions with 1-haloethers to produce the corresponding 1-aziridinyl ethers and that if these ethers have a halogen atom on the carbon atom adjacent to that to which the aziridinyl radical is attached they can be readily converted to the corresponding vinyl- or substituted-vinyl aziridine.

The reactions involved in the present invention can be illustrated as follows:

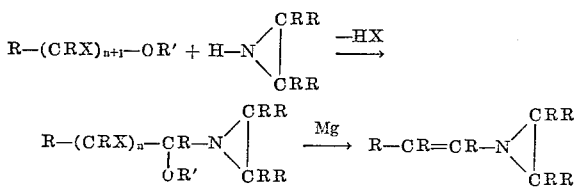

wherein R' is an inert hydrocarbon radical, preferably alkyl, alkenyl, phenyl or cycloalkyl, and preferably containing no more than about 6 carbon atoms, R is H or an inert hydrocarbon radical of the same class as R', $n$ is 0 or 1 and X is a halogen, preferably chlorine or bromine.

The first of the above reactions proceeds readily at temperatures near or below ordinary room temperatures; i.e., at −50° or below up to about 20° C., and in the presence of at least a stoichiometric amount of an acid acceptor. It is preferred to use at least the stoichiometric amount, and suitably up to about twice that amount, of the aziridine. The reaction is conveniently run in an inert solvent in which the reactants and product are soluble but the byproduct halide salt is insoluble. Suitable solvents include aliphatic and aromatic hydrocarbons, ethers, tetrahydrofuran, and the like.

The acid acceptor may be an alkali metal hydroxide or carbonate, a teriary amine, or other base which effectively neutralizes the byproduct HX. Tertiary amines are especially convenient because of their ready solubility in most organic media.

The second of the above reactions can occur only when $n$ is at least one in the above formulas. It is carried out in an inert, anhydrous solvent, suitably at a temperature of about 20–100° C. Suitable conditions are essentially those for a Grignard reaction; i.e., magnesium is used, preferably as turnings or other form having high surface area, the reaction of which may be catalyzed by a trace of iodine, alkyl halide or other known catalyst for the reaction of Mg with an organic halide.

Aziridines suitable for use in the process of the invention are those in which the nitrogen atom of the aziridine ring bears a hydrogen atom. The carbon atoms of the aziridine ring can bear up to four inert substituent radicals, though as a practical matter those having not more than two such substituents are preferred. Thus, suitable aziridines includes aziridine; 2-alkylaziridines, such as 2-methyl-, 2-ethyl-, 2-isopropyl-, 2-n-butyl, 2-isobutyl- and 2-tert.-butylaziridine; the 2,2-dialkylaziridines, such as 2,2-dimethyl-, 2,2-diethyl-, 2-methyl-2-n-butyl- and 2,2-di-sec.-butylaziridine; the 2,3-dialkylaziridines, such as 2,3-dimethyl-, 2,3-diethyl-, 2,3-dibutyl-, 2-methyl-3-isobutyl- and 2-isopropyl-3-tert.-butylaziridine; the 2,2,3-trialkylaziridines, such as 2,2,3-trimethyl-, 2,2,3-tributyl- and 2,2-dimethyl-3-propylaziridine; and the 2,2,3,3-tetraalkylaziridines, such as tetramethy-, tetraethyl- and tetrabutylaziridine. Also suitable are those aziridines having one or more inert aryl radicals in the 2- and/or 3-position, such as 2-phenylaziridine, 2-methyl-3-benzylaziridine, 2,3-diphenylaziridine, 2,2-diethyl-3-o-tolylaziridine and the like. Similarly, other useful aziridines can have other inert substituents in the 2- and/or 3-position, such as cyclohexyl, allyl, butenyl, viny, and the like.

The 1-haloalkyl ethers that are suitable for use in the process of the invention are those having the above formula wherein R and R' are inert radicals. Thus, suitable ethers include, for example, 1-chloroethyl methyl ether, 1-bromopropyl methyl ether, 1,2-dichloroethyl ethyl ether, 1,2-dibromoethyl butyl ether, 1,2-dichlorohexyl hexyl ether, 1,2-dibromo-2-phenylethyl methyl ether, 1-chloro-2-phenylethyl phenyl ether, 1-bromo-2-cyclohexylethyl benzyl ether, 1,2-dichloro-2-(o-tolyl)ethyl allyl ether, 1-bromo-2-chloro-4-hexenyl 2-butenyl ether and the like.

The practice of the invention is illustrated by the following examples:

Example 1

A mixture of two moles (86 g.) of aziridine with 1.1 moles of triethylamine in a liter of petroleum ether was cooled in an ice bath to 0° C. One mole (143 g.) of 1,2-dichloroethyl ethyl ether was added slowly with vigorous stirring over a three-hour period while maintaining the temperature at 0–10° C. After the addition was complete, stirring was continued for two hours at 0° C. The white precipitate of triethylamine hydrochloride was filtered off and the filtrate distilled under reduced pressure. A yield of 61.5 percent of theoretical of 1-(1-ethoxy-2-chloroethyl)aziridine was obtained. The product had the following characteristics: liquid, $b_2$ 38° C.; $n_D^{24}$ 1.4463; $D_4^{25}$ 1.0451; soluble in petr. eth., $CH_2Cl_2$, $Et_2O$, $Me_2CO$, EtOH; v. sl. soluble in water.

The above reaction was repeated using substantially the same reactant ratios, but in each of two solvents—ethyl ether and tetrahydrofuran. The products were identical and yields were above 70 percent.

Example 2

In a manner similar to that of Example 1 the dibromo analogue of the ether was reacted with aziridine in diethyl ether to give an 86.5 percent yield of 1-(1-ethoxy-2-bromoethyl)aziridine. This product has the following characteristics: liquid $B_3$ 45–6° C.; $n_D^{23}$ 1.4695; $D_4^{25}$ 1.31; the solubility of the product was similar to that of the product of Example 1, except that the bromo compound was more insoluble in water.

Example 3

Nine moles of aziridine in petroleum ether was cooled to −50° C. and 1-chloro-ethyl methyl ether (3 moles) was added with vigorous stirring. Addition was conducted slowly to maintain temperature at less than −50° C. After this addition was complete, a 50 percent aqueous solution of 240 g. of NaOH was added slowly with stirring, after which the resulting reaction mixture was allowed to come slowly to room temperature. With suitable extraction and filtration procedures, a liquid mixture was finally obtained which upon distillation under reduced pressure yielded 50 percent of the theoretical amount of 1-(methoxyethyl)aziridine based upon the acetaldehyde used to prepare the starting alpha-haloether. The compound has the following characteristics: liquid, $B_6O$ 40° C.; $n_D^{23}$ 1.4130; $D_4^{25}$ 0.8784.

*Example 4*

Two moles of magnesium turnings was placed in a dry flask and covered with tetrahydrofuran; a few milliliters of the product of Example 2 was added along with one milliliter of EtBr. After about two hours the reaction refluxed and the remainder of one mole of 1-(1-ethoxy-2-bromoethyl)aziridine dissolved in tetrahydrofuran was added with stirring over a 2-hour period. The mixture was then stirred overnight at room temperature, after which it was distilled at atmospheric pressure to yield about 30 percent of the theoretical amount of N-vinylaziridine. The product boiled at 53–55° C. and had $n_D^{23}$ 1.4260.

*Example 5*

When the process of Example 4 was repeated, the starting material being the product of Example 1 instead of that of Example 2, the same product, N-vinylaziridine was produced.

In the manner of Examples 1–3, 1-(1-ethoxybutyl)aziridine is produced by the reaction of aziridine with 1-chlorobutyl ethyl ether, 1-(1-butoxy-2-chloro-hexyl)aziridine is produced by the reaction of aziridine with 1,2-dichlorohexyl butyl ether, 1-(1-alloxy-2-phenylethyl)-2-methylaziridine is produced by the reaction of 2-methylaziridine with 1-bromo-2-phenylethyl allyl ether, 1-(1-hexoxy-2-chloro-2-phenylethyl)-2,3-diethylaziridine is produced by the reaction of 2,3-diethylaziridine with 1,2-dichloro-2-phenylethyl hexyl ether and 1-(1-ethoxy-2-bromo-3-butenyl)-2-phenylaziridine is produced by the reaction of 2-phenylaziridine with 1,2-dibromo-3-butenyl ethyl ether.

In the manner of Example 4, 1-(2-hexenyl)aziridine is made from 1-(1-butoxy-2-chlorohexyl)aziridine or other 1(1-alkoxy-2-halohexyl)aziridine, 1-(2-phenylvinyl)-2,3-diethylaziridine is produced from 1-(1-hexoxy-2-chloro-2-phenylethyl)2,3-diethylaziridine or other 1-(1-alkoxy-2-halo-2-phenylethyl)-2,3-diethylaziridine and 1-(1,3-butadienyl)-2-phenylaziridine is produced from 1-(1-ethoxy-2-bromo-3-butenyl)-2-phenylaziridine or other 1-(1-alkoxy-2-halo-3-butenyl)-2-phenylaziridine.

The compounds of this invention are useful as chemical intermediates. They react with compounds containing active hydrogens to produce the corresponding 2-aminoethyl derivatives in the manner known for aziridines in general. Thus, with ammonia they form useful substituted ethylenediamines. These may in turn react with additional aziridine compounds to produce substituted polyethylene polyamines useful for the general purposes characteristic of the polyalkylene polyamines.

The 1-(1-alkoxy-2-haloalkyl)-aziridines are particularly useful for making vinyl- and substituted vinylaziridines as illustrated in Examples 4 and 5.

The 1-(1-alkoxyalkyl)aziridines have biological activity. Thus, 1-(1-methoxyethyl)aziridine, the product of Example 3, produced a 60 percent kill when applied to plum curculios as an aqueous spray in a concentration of 500 parts per million.

I claim:

1. Compounds having the formula

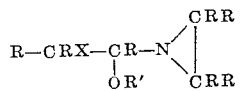

wherein R' is a hydrocarbon radical of 1 to 6 carbon atoms, each R is a radical independently selected from the group consisting of H and hydrocarbon radicals of 1 to 6 carbon atoms and X is a halogen having an atomic number from 17 to 35.

2. Compounds having the formula

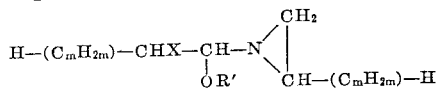

wherein R' is an alkyl radical containing up to 6 carbon atoms, $m$ is an integer from 0 to 6, and X is a halogen having an atomic number from 17 to 35.

3. 1-(1-alkoxy-2-haloalkyl)aziridines wherein the alkoxy and alkyl radicals each contain up to 6 carbon atoms and the halogen has an atomic number of 17 to 35.

4. 1-(1-ethoxy-2-chloroethyl)aziridine.

5. 1-(1-ethoxy-2-bromoethyl)aziridine.

6. The process for making 1-(1-alkoxy-2-haloalkyl)-aziridine comprising reacting by contacting, in the presence of an acid acceptor, a 1,2-dihaloalkyl alkyl ether with at least about one molecular equivalent of an aziridine having a hydrogen atom on the nitrogen atom, any substituents on the carbon atoms of the aziridine ring being alkyl radicals, and wherein in said process each alkyl group in each reactant contains up to 6 carbon atoms.

7. The process for making 1-(1-ethoxy-2-haloethyl)-aziridine comprising reacting by contacting, in the presence of an acid acceptor, a 1,2-dihaloethyl ethyl ether wherein the halogen has an atomic number from 17 to 35 with at least about one molecular equivalent of aziridine.

References Cited by the Examiner

FOREIGN PATENTS 899,955  9/1944  France.

ALEX MAZEL, *Primary Examiner.*

A. D. ROLLINS, *Assistant Examiner.*